(12) United States Patent
Krasny

(10) Patent No.: US 6,563,925 B1
(45) Date of Patent: May 13, 2003

(54) METHOD AND APPARATUS FOR SPACE-TIME ECHO CANCELLATION

(75) Inventor: Leonid Krasny, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/287,102

(22) Filed: Apr. 7, 1999

(51) Int. Cl.⁷ .............................................. H04M 9/08
(52) U.S. Cl. ............................ 379/406.05; 379/388.01; 379/406.08; 379/406.13; 370/289; 455/570
(58) Field of Search .......................... 379/406, 388.01, 379/388.02, 390.02; 455/570; 370/286, 289

(56) References Cited

U.S. PATENT DOCUMENTS 5,796,819 A * 8/1998 Romesburg ............ 379/406.09
6,314,147 B1 * 11/2001 Liang et al. ................. 375/346

FOREIGN PATENT DOCUMENTS

WO    WO 98 04079 A    1/1998

OTHER PUBLICATIONS

Coupled Adaptive Filters for Acoustic Echo Control and Noise Reduction, Martin, R., et al., Proceedings of the International Conference on Acoutics, Speech, and Signal Processing, vol. Conf. 20, pp. 3043–3046.

Coupled adaptive filters for acoustic echo control and noise reduction Martin, R.; Altenhoner, J., Acoustics, Speech, and Signal Processing, 1995. ICASSP–95., 1995 International Conference on, pp.: 3043–3046 vol. 5.*

Murano, K. et al., Echo Cancellation and Applications, IEEE Communications Magazine, Jan. 1990, pp. 49–55.*

Turbin, V. et al., Comparison of Three Post–Filtering Algorithms for Residual Acoustic Echo Reduction, IEEE International Conference on Acoustics, Speech, and Signal Processing, Apr. 1997, vol. 1, pp. 307–310.*

* cited by examiner

Primary Examiner—Forester W. Isen
Assistant Examiner—Daniel Swerdlow
(74) Attorney, Agent, or Firm—Coats & Bennett, P.L.L.C.

(57) ABSTRACT

Echo is canceled in a communication device including at least one microphone and a loudspeaker. Signals directed to the loudspeaker are filtered through at least one first filter. The filtered signals are subtracted from signals received by the microphone. At least one second filter filters the subtracted results to produce a signal corresponding to speech signals received by the microphone. At least one third filter filters the subtracted results to produce a signal corresponding to echo from the loudspeaker. The output from the third filter is subtracted from the output from the second filter to produce an echo-canceled signal. The device may include a number of microphones, and the first, second, and third filters may each include a number of filters equal to the number of microphones. The outputs from the second filter may be added, the outputs from the third filter may be added, and the sum of the outputs from the third filter may be subtracted from the sum of the outputs of the second filter. The output from the third filter may be weighted before being subtracted from output of the second filter.

8 Claims, 4 Drawing Sheets

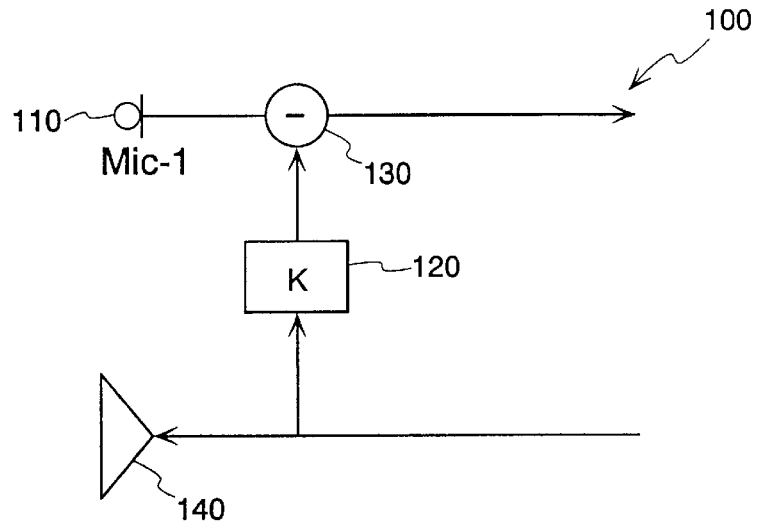
Fig. 1
*(Prior Art)*
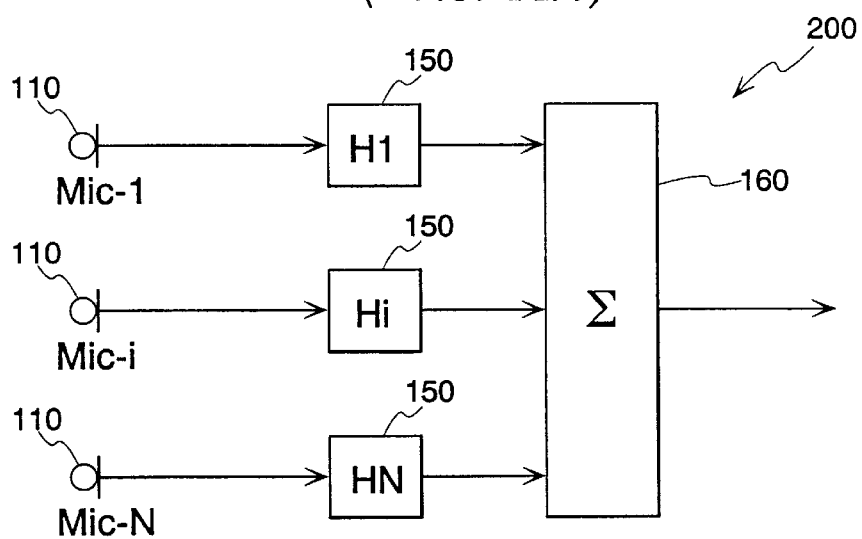
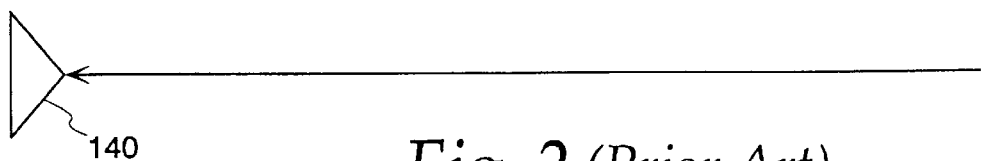
Fig. 2 *(Prior Art)*

METHOD AND APPARATUS FOR SPACE-TIME ECHO CANCELLATION

BACKGROUND

This invention relates generally to a method and apparatus for echo cancellation. More particularly, this invention relates to a method and apparatus for space-time echo cancellation in a communication system.

Echo related problems are very common in communication systems such as cellular telephone systems. In such systems, speech originating from a far-end loud speaker echoes back to a microphone with a time delay causing perception problems. Perception is further impaired when the speaker is situated in a noisy environment, as in the case of a car telephone operating in a hands-free mode.

Echo cancellation has been used to decrease the echo from the far-end speaker during hands-free communication, and a considerable amount of effort has been spent in this field. One approach to cancelling echo is the single-microphone echo suppression technique which utilizes differences in the spectral characteristics of speech and noise. This type of method is disclosed, for example, in S. F. Boll, "Suppression of acoustic noise in speech using spectral subtraction", IEEE Trans. on Acoustics, Speech, and Signal Processing, ASSP-27(2):113–120, April 1979; R. J. McAulay and M. L. Malpass, "Speech enhancement using a soft-decision noise suppression filter", IEEE Trans. on Acoustics, Speech, and Signal Processing, ASSP-28:137–145, 1980; M. Sambur, "Adaptive noise canceling for speech signals, IEEE Trans. on Acoustics, Speech, and Signal Processing, ASSP-26:419–423, 1978; Y. Ephraim and D. Malah, "Speech enhancement using a minimum mean-square error short-time spectral amplitude estimator", IEEE Trans. on Acoustics, Speech, and Signal Processing, ASSP-32:1109–1121, 1984; P. Sorqvist, P. Handel, and B. Ottersten, "Kalman filtering for low distortion speech enhancement in mobile communication", Proc. IEEE International Conference on Acoustics, Speech, and Signal Processing, volume 2, 1219–1222, Munich, Germany, April 1997; S. H. Jensen, P. C. Hansen, and J. A. Sorensen, "A signal subspace approach for noise reduction of speech signals", Proc. EUSIPCO European Signal Processing Conference, volume 2, 1174–1177, Lausanne, Switzerland, 1994, EURASIP; and Jesper Jansson and Peter Kaarle, "Noise cancelling by spectral magnitude subtraction", Master Thesis, January 1992, Ericsson Mobile Communication A B, Department of Tele Transmissions Theory, Lund Institute of Technology, Sweden.

A conventional system for performing single microphone echo cancellation is illustrated in FIG. 1. The system includes a filter 120 into which a signal directed to a loudspeaker 140 is fed. The output of the filter 120 represents the echo from the loudspeaker 140. The output of the filter 120 is subtracted from a signal received from a microphone 110 in a subtractor 130, resulting in a signal in which the echo from the loudspeaker is canceled.

A processing algorithm for single microphone echo cancellation can be described by the following equation:

$$U_{out}(\omega) = U(\omega,r) - K(\omega) U(\omega, r_e) \qquad (1)$$

where $r_e$ represents the spatial coordinates of the loudspeaker, r represents the spatial coordinates of the single microphone, $U_{out}(\omega)$ is the Fourier transform of the resulting signal in which the echo is canceled, $U(\omega,r)$ is the Fourier transform of the signal u(t,r) observed at the output of the single microphone 110, $U(\omega,r_e)$ is the Fourier transform of a signal $u(t,r_e)$, e.g., a voltage, directed to the loudspeaker 140, and $K(\omega)$ is the frequency response of the filter 120, which may be calculated according to the equation:

$$K(\omega) = G(\omega, r_e, r) \qquad (2)$$

where $G(\omega,r_e,r)$ is the Green function which describes signal propagation from the loudspeaker 140 to the single microphone 110. The filter 120 simulates the frequency response of the noise generated by the loudspeaker 140. This noise is subtracted from the signal received by the microphone 110, resulting in a signal in which the echo is canceled.

In many situations, speech and noise tend to have similar spectral distributions. In such situations, the single-microphone echo suppression technique does not yield substantial improvement in speech intelligibility. On the other hand, the signal and the echo in a car environment are acoustical fields which have different spatial characteristics. Taking this into account, the spatial separation of the speech and the echo can be exploited to reduce the noise level without any bad effects on the speech.

It is known that spatial signal processing requires arrays that combine the outputs of several microphones. Techniques which utilize arrays in conjunction with signal processing have been developed and applied in other fields such as sonar and seismic focus searching. This type of technique, called "matched-field processing", can achieve effective rejection of underwater noise (ambient noise and ocean reverberation), as described in L. G. Krasny, "Spatial processing of acoustic signals in a plane-parallel waveguide", Sov. Phys. Acoust., 30, 4, 495–501, 1984 and A. B. Baggeroer, W. A.Kuperman, and H. Shmidt, "Matched-field processing: source localization in correlated noise as an optimum parameter estimation problem", J. Acoust. Soc. Am. 83, 571–587, 1988.

FIG. 2 illustrates a conventional system for performing matched field processing. The system includes N filters 150 which filter N signals received from microphones 110 to remove noise from the signals, where N=1, 2, 3, . . . The filters 150 simulate the frequency response of the noise, including the echo from the loudspeaker 140. The filtered results are summed in a summer 160, and the resulting sum is a signal in which the echo is canceled.

A matched-field processing algorithm can be described by the following equation:

$$U_{out}(\omega) = \sum_{i=1}^{N} U(\omega, r_i) H^*(\omega; r_i) \qquad (3)$$

where $r_i$ represents the spatial coordinates of the ith microphone, $U_{out}(\omega)$ is the Fourier transform of the signal output from the summer 160, $U(\omega,r_i)$ is the Fourier transform of the field $u(t,r_i)$ observed at the output of the i-th microphone 110, and $H(\omega;r_i)$ is the amplitude-phase distribution at the aperture of the array which satisfies the system of equations:

$$\sum_{k=1}^{N} g_N(\omega; r_i, r_k) H(\omega; r_k) = \exp(i\omega |r_i - r_o|/c), \qquad (4)$$

where $g_N(\omega;r_i,r_k)$ is the spatial correlation function of the background noise, $r_o$ represents the spatial coordinates of the talker, and c represents the speed of sound.

There are some difficulties which become apparent when the matched-field processing technique is applied for echo cancellation in a car telephone environment. First, matched-field processing is based on an assumption that the microphone array is located in a free-field propagation channel. However, the free-field propagation model does not take into account the effects of the waveguide sound propagation in a car cabin and is thus unrealistic for a car environment. Secondly, matched-field processing does not take into account a priori information about the spatial structure of the echo field. Since it is known that the echo field is the spatial-coherent acoustic field, it would be worthwhile to explore the possibility of suppressing spatial-coherent acoustic noise by means of the algorithms, in which technical feasibility would be combined with a reasonably high performance. Third, matched-field processing does not account for the speech signal output by a loudspeaker. Including this signal would substantially improve performance of the echo cancellation.

There is thus a need for a method and apparatus for echo cancellation which avoids the problems of the prior art.

SUMMARY

It is therefore an object of the present invention to provide a method and apparatus for echo cancellation that takes into account a signal output from a loudspeaker while exploiting the spatial separation of the speech and echo to reduce the noise level.

According to exemplary embodiments, this and other objects are met by a method and apparatus for echo cancellation in a communication device comprising a loudspeaker and at least one microphone. Signals directed to the loudspeaker are filtered through at least one first filter. The filtered signals are subtracted from signals received by the microphone. At least one second filter filters the subtracted results to produce a signal corresponding to speech signals received by the microphone. At least one third filter filters the subtracted results to produce a signal corresponding to echo from the loudspeaker to the microphone. The output from the third filter is subtracted from the output from the second filter to produce an echo-canceled signal.

According to an exemplary embodiment, there are a number of microphones, and the first, second, and third filters each comprise a number of filters equal to the number of microphones. The outputs from the second filter are added, the outputs from the third filter are added, and the sum of the outputs from the third filter is subtracted from the sum of the outputs of the second filter. The output from the third filter may be weighted before being subtracted from the output of the second filter.

BRIEF DESCRIPTION OF THE DRAWINGS

The features, objects, and advantages of this invention will become apparent by reading this description in conjunction with the accompanying drawings, in which like reference numerals refer to like elements and in which:

FIG. 1 illustrates a conventional system for single microphone echo cancellation;

FIG. 2 illustrates a conventional system for matched-field processing echo cancellation;

DETAILED DESCRIPTION

For illustrative purposes, the following description is directed to a cellular radio communication system, but it will be understood that this invention is not so limited and applies to other types of communication systems.

According to exemplary embodiments, a combination of single microphone time echo cancellation and microphone array matched-field space echo cancellation is employed.

Figure 3:
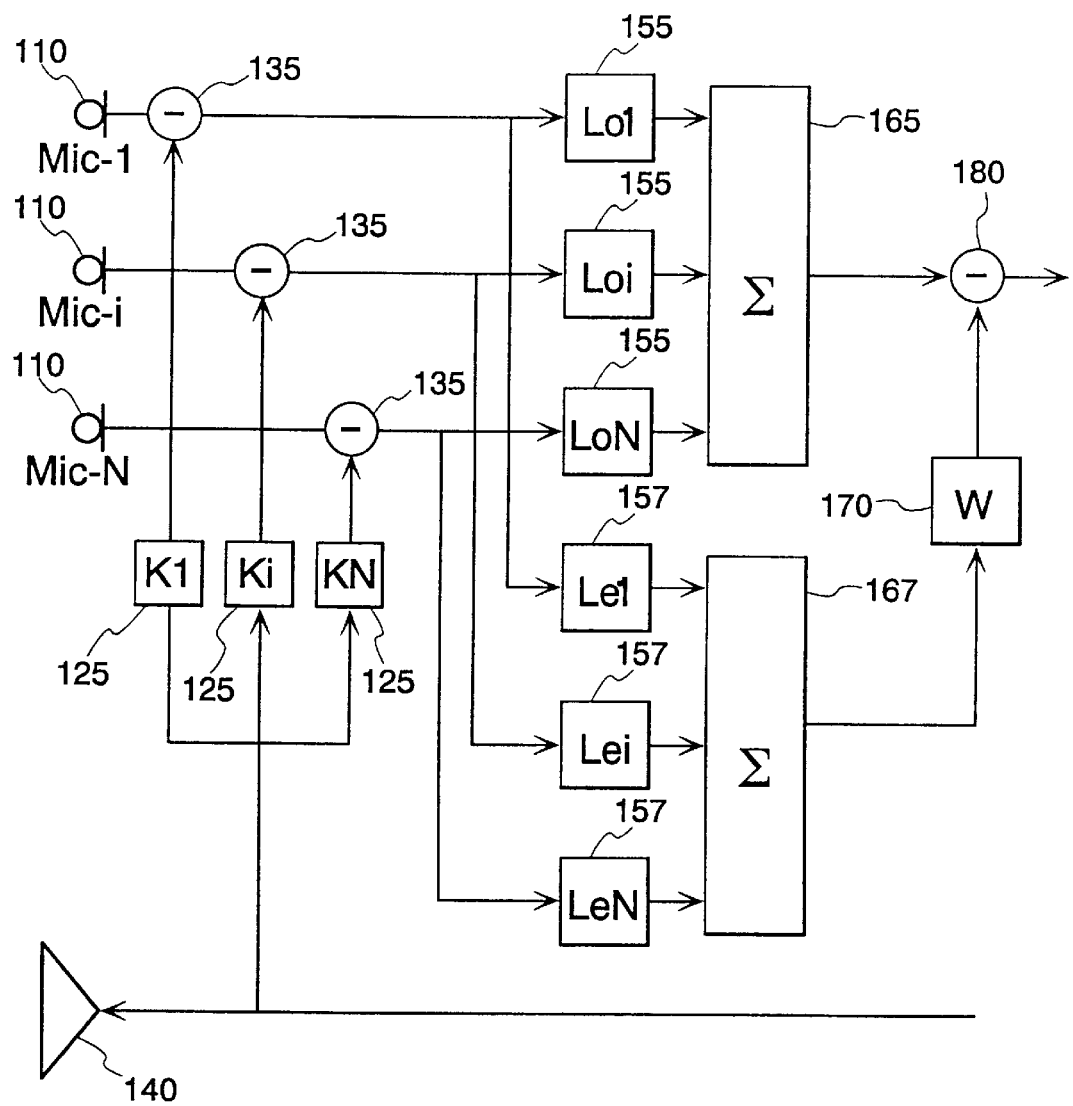
FIG. 3 illustrates a system for space-time echo cancellation according to an exemplary embodiment.

An exemplary apparatus for performing space-time echo cancellation is illustrated in FIG. 3. As shown in FIG. 3, N signals are received at an array of N microphones 110, where N=1, 2, 3. . . Signals directed to a loudspeaker 140 are filtered through N first filters 125, which simulate the frequency response of the noise generated by the loudspeaker 140. The filtered signals are then subtracted from the received signals in N subtractors 135. The subtracted signals are filtered through N second filters 155 and N third filters 157. The outputs of the second filters 155 correspond to speech signals received by the respective microphones, while the outputs of the third filters 157 correspond to the echo from the loudspeaker 140 to each respective microphone. The outputs of the filters 155 and 157 are summed in summers 165 and 167, respectively. The output of the summer 167, which represents the echo, is filtered through a weighting filter 170 to weight the echo. The weighted result is subtracted from the output of the summer 165, which represents the received signal, in a subtractor 180, producing a subtraction result in which the echo is canceled.

For ease of explanation, the algorithm for cancelling echo can be separated into a time processing algorithm and a space processing algorithm. According to an exemplary embodiment, the results produced by a time processing algorithm can be described by the following equation:

$$\Delta U(\omega, r_i) = U(\omega, r_i) - K(\omega, r_i) U(\omega, r_e) \tag{5}$$

where $r_i$ represents the spatial coordinates of the i-th microphone, $r_e$ represents the spatial coordinates of the loudspeaker, $\Delta U(\omega, r_i)$ is the Fourier transform of a time echo-canceled signal from an i-th microphone 110, $U(\omega, r_i)$ is the Fourier transform of the field observed at the output of the i-th microphone 110, $U(\omega, r_e)$ is the Fourier transform of the loudspeaker output voltage, and $K(\omega, r_i)$ is the frequency response of the time processing filter 125 at the i-th microphone, which can be calculated according to the equation:

$$K(\omega, r_i) = \frac{R(\omega; r_i, r_e)}{R(\omega; r_e, r_e)} \tag{6}$$

where $R(\omega; r_i, r_e)$ and $R(\omega; r_e, r_e)$ are, respectively, cross correlation and auto correlation functions between the outputs of the i-th microphone 110 and the loudspeaker 140. These correlation functions can be estimated by using standard adaptive algorithms, for instance:

$$R^{(n)}(\omega; r_i, r_e) = m\, R^{(n-1)}(\omega; r_i, r_e) + (1-m) U^{(n)}(\omega, r_i)[U^{(n)}(\omega, r_e)]^* \tag{7}$$

and $$R^{(n)}(\omega; r_e, r_e) = m\, R^{(n-1)}(\omega; r_e, r_e) + (1-m)|U^{(n)}(\omega, r_e)|^2 \tag{8}$$

where $R^{(n)}(\omega; r_i, r_e)$ and $R^{(n)}(\omega; r_e, r_e)$ are, respectively, the estimates of the correlation functions $R(\omega; r_i, r_e)$ and $R(\omega; r_i,$ $r_e$) at the n-th iteration, $U^{(n)}(\omega,r_i)$ is the Fourier transform of the field $u(t,r_i)$ calculated at the n-th iteration interval, and m is a convergence factor.

It can be seen that the time processing algorithm given in Equation (5) reduces the echo at the output of every microphone of the array.

An exemplary space processing algorithm can be described by the following equation:

$$U_{out}(\omega)=U_o(\omega)-W(\omega)U_e(\omega) \quad (9)$$

According to Equation (9), space processing uses two spatial channels: a signal channel $U_o(\omega)$ representing the received speech signal from a talker and the compensation channel $U_e(\omega)$ representing echo from the loudspeaker 140. The signal representing the compensation channel is weighted by a function $W(\omega)$ and subtracted from the signal representing the signal channel to produce the echo-canceled output signal $U_{out}(\omega)$.

The signal channel $U_O(\omega)$ can be given by the expression:

$$U_o(\omega) = \sum_{i=1}^{N} \Delta U(\omega, r_i) L^*(\omega; r_i, r_o) \quad (10)$$

where $r_O$ represents the spatial coordinates of the a talker.

The compensation channel $U_e(\omega)$ can be given by the expression:

$$U_e(\omega) = \sum_{i=1}^{N} \Delta U(\omega, r_i) L^*(\omega; r_i, r_e) \quad (11)$$

where $r_e$ represents the spatial coordinates of the loudspeaker 140.

The amplitude-phase distributions $L(\omega; r_i, r_o)$ and $L(\omega); r_i, r_e)$ in the signal and the compensation channels are matched with the spatial structure of the signal and the background noise, respectively, and satisfy the following system of equations:

$$\sum_{k=1}^{N} g_N(\omega; r_i, r_k) L(\omega; r_k, r) = G(\omega; r_i, r) \quad (12)$$

where $g_N(\omega; r_i, r_k)$ is the spatial correlation function of the background noise, and $G(\omega; r_i, r)$ is the Green function which describes signal propagation from a talker ($r=r_o$) or the loudspeaker ($r=r_e$) to the receiving microphone array.

The amplitude-phase distribution $L(\omega; r_i, r_e)$ in the signal channel is optimized to detect the signal field against the background noise, while the amplitude-phase distribution $L(\omega, r_i, r_e)$ in the compensation channel is optimized to detect echo against the background noise.

If the spatial correlation function $g_N(\omega; r_i, r_e)$ is a priori unknown, it can be estimated by using the standard adaptive algorithms, for instance:

$$g_N^{(n)}(\omega; r_i, r_e) = m_g g_N^{(n-1)}(\omega; r_i, r_k) + (1-m_g) U^{(n)}(\omega, r_i) [U^{(n)}(\omega, r_k)]^* \quad (13)$$

where $g_N^{(n)}(\omega r_i, r_e)$ is the estimate of the correlation function $g_N(\omega; r_i, r_e)$ at the n-th iteration, and $m_g$ is a convergence factor.

The compensation channel $U_e(\omega)$ is weighted with the weighting fiction $W(\omega)$ which can be calculated according to the equation:

$$W(\omega) = \frac{R_{oe}(\omega)}{R_{ee}(\omega)} \quad (14)$$

where $R_{oe}(\omega)$ and $R_{ee}(\omega)$ are, respectively, cross correlation and auto correlation functions between the signal and compensation channels. The weighted compensation channel is then subtracted from the signal channel $U_o(\omega)$, resulting in a signal in which the echo is canceled. The weighting of the compensation channel $U_e(\omega)$ increases the echo correlation between the signal and compensation channels to make the subtraction more efficient.

It can be seen that the space processing algorithm reduces the echo in the signal channel. It should be noted here that the calculation of the weighting function $W(\omega)$ does not require any a priori information about the Green function of the propagation channel.

The correlation functions $R_{oe}(\omega)$ and $R_{ee}(\omega)$ can be estimated by using the adaptive algorithms which are similar to Equations (7)–(8):

$$R_{oe}^{(n)}=m R_{oe}^{(n-1)}(\omega)+(1-m) U_o^{(n)}(\omega)[U_e^{(n)}(\omega)]^* \quad (15)$$

and $$R_{ee}^{(n)}(\omega)=m R_{ee}^{(n-1)}(\omega)+(1-m)|U_e^{(n)}(\omega)|^2 \quad (16)$$

Figure 4:
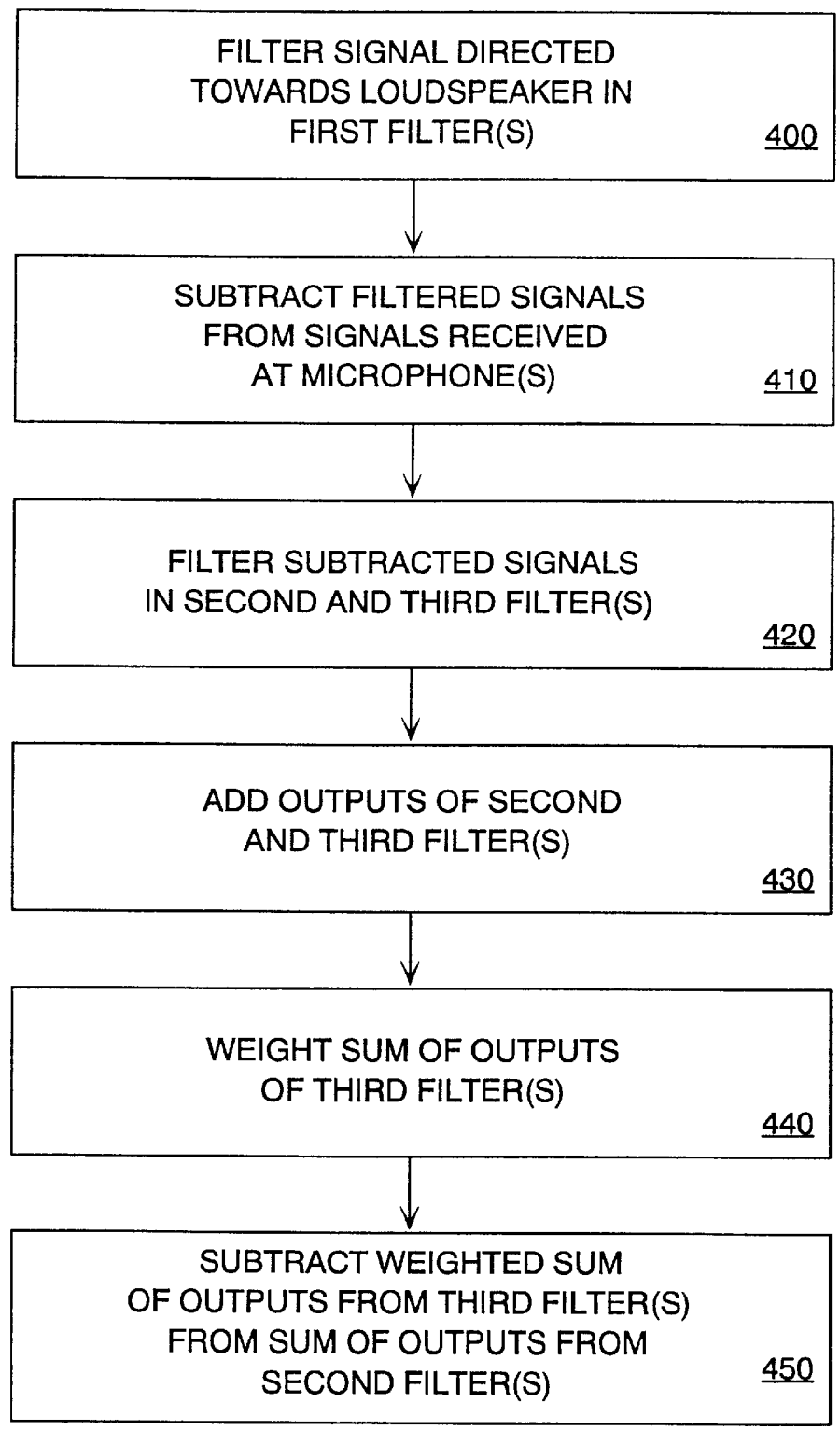
FIG. 4 illustrates a method for space-time echo cancellation according to an exemplary embodiment.

FIG. 4 illustrates a method for space-time echo cancellation according to an exemplary embodiment. The method begins at step 400 at which signals directed to a loudspeaker are filtered in one or more first filters to simulate the propagation from the loudspeaker to the microphone. At step 420, the filtered signals are subtracted from signals received at one or more microphones. At step 430, the subtracted results are filtered through one or more first filters and one or more second filters, the output(s) of the first filters representing the signal channel, and the output(s) of the second filters representing a compensation channel. At step 440, the filtered results are added for each set of filters. At step 450, the added result for the compensation channel is weighted. Finally, at step 460, the weighted results are subtracted from the added result for the signal channel.

Figure 5:
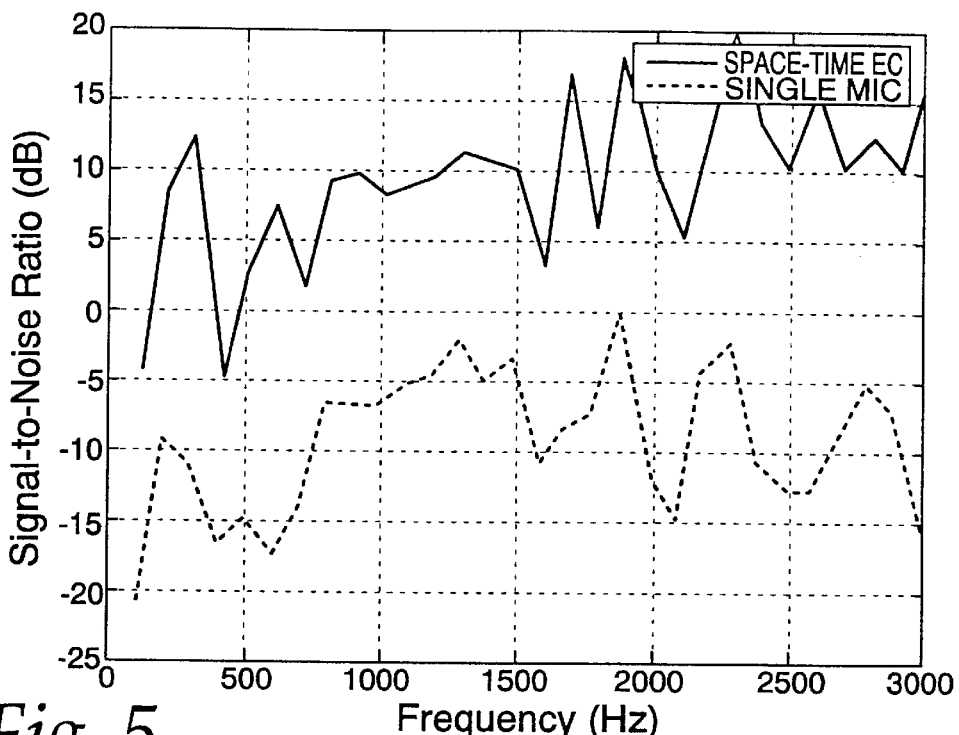
FIG. 5 illustrates simulation results using a 2-microphone array.
Figure 6:
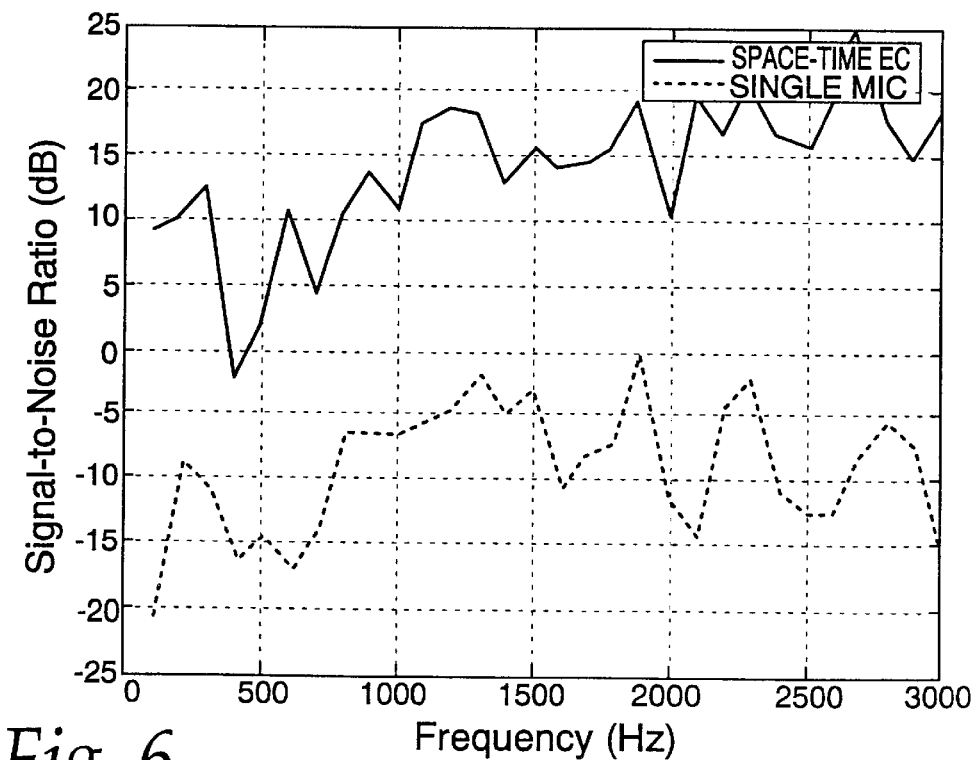
FIG. 6 illustrates simulation results using a 4-microphone array.

FIGS. 5 and 6 illustrate results of computer simulations of the space-time echo cancellation technique according to exemplary embodiments. In FIGS. 5 and 6, the output signal-to-noise ratio is plotted as a function of frequency. The solid lines represent the signal-to-noise ratio at different frequencies using the space-time echo cancellation technique according to exemplary embodiments, and the dashed lines represent the signal-to-noise ratio at different frequencies using a conventional single microphone echo cancellation technique. The simulations were carried out for 2-microphone (FIG. 5) and 4-microphone (FIG. 6) arrays in a simulated car environment. From FIGS. 5 and 6, it can be seen that the space-time echo cancellation technique according to exemplary embodiments allows substantial attenuation (e.g., 25–30 dB) of the noise field in a car cabin without suppression and degradation of the speech signal.

According to exemplary embodiments of the present invention, speech enhancement and acoustic echo cancellation is made possible in a noisy environment, such as a hands-free mobile telephone in a car. The technique takes advantage of both the microphone array matched-field processing and the single-microphone echo suppression techniques, offering several advantages, such as allowing spatial selection/suppression of targets/jammers, and exploiting and combining the speech signal that is output by a loudspeaker to improve the performance of the array processing. In contrast to the conventional matched-field processing method, the method according to exemplary embodiments takes into account the effects of the waveguide sound propagation in a car cabin and takes into account a prior information about the spatial-coherent structure of the echo field. As a result, the method provides suppression of the echo and car noise simultaneously, robust processing, and adaptation to the actual acoustic environment.

It will be appreciated by those of ordinary skill in the art that this invention can be embodied in other specific forms without departing from its essential character. The embodiments described above should therefore be considered in all respects to be illustrative and not restrictive. For example, although described above with reference to a car phone environment, the invention is also applicable in other types of communication systems.

What is claimed is:

1. An apparatus for echo cancellation in a communication device comprising a loudspeaker and at least one microphone, comprising:

at least one first filter for filtering signals directed to the loudspeaker;

at least one first subtractor for subtracting the filtered signals from signals received by the microphone;

at least one second filter for filtering the subtracted results to produce a signal corresponding to speech signals received by the microphone;

at least one third filter for filtering the subtracted results to produce a signal corresponding to echo from the loudspeaker to the microphone; and a second subtractor for subtracting the output from the third filter from the output from the second filter to produce an echo-canceled signal.

2. The apparatus of claim 1, wherein there are a number of microphones, and the first, second, and third filters each comprise a number of filters equal to the number of microphones.

3. The apparatus of claim 2, further comprising first and second summers, wherein the outputs from the second filters are added in the first summer, the outputs from the third filters are added in the second summer, and the sum of the outputs from the third filters is subtracted from the sum of the outputs of the second filters in the second subtractor.

4. The apparatus of claim 1, further comprising a fourth filter for weighting the output from the third filter before it is subtracted from output of the second filter.

5. A method for echo cancellation in a communication device comprising a loudspeaker and at least one microphone, the method comprising the steps of:

filtering signals directed to the loudspeaker in at least one first filter;

subtracting the filtered signals from signals received by the microphone in at least one first subtractor;

filtering the subtracted results in at least one second filter to produce a signal corresponding to speech signals received by the microphone;

filtering the subtracted results in at least one third filter to produce a signal representing echo from the loudspeaker to the microphone; and subtracting the filtered signals output from the third filter from the filtered signals output from the second filter in a second subtractor to produce an echo-canceled signal.

6. The method of claim 5, wherein there are a number of microphones, and the first, second, and third filters each comprise a number of filters equal to the number of microphones.

7. The method of claim 6, further comprising:

adding outputs from the second filters; and adding outputs from the third filters, wherein the step of subtracting includes subtracting the sum of the outputs from the third filters from the sum of the outputs of the second filters.

8. The method of claim 5, further comprising weighting the output from the third filter before subtracting it from the output of the second filter.

* * * * *